(12) United States Patent
Grando

(10) Patent No.: US 7,320,771 B2
(45) Date of Patent: Jan. 22, 2008

(54) METHOD OF MAKING A RIBBED PART OUT OF THERMOPLASTIC MATERIAL COVERED IN A CONDUCTIVE FOIL, AND A RIBBED PART

(75) Inventor: Jerome Grando, Vertrieu (FR)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 11/271,319

(22) Filed: Nov. 10, 2005

(65) Prior Publication Data

US 2006/0115622 A1 Jun. 1, 2006

(30) Foreign Application Priority Data

Nov. 10, 2004 (FR) ................... 04 11988

(51) Int. Cl.
B29C 45/16 (2006.01)
(52) U.S. Cl. ............... 264/273; 264/328.12; 264/275; 264/272.15
(58) Field of Classification Search ............ 264/273
See application file for complete search history.

(56) References Cited

U.S. PATENT DOCUMENTS 4,584,767 A * 4/1986 Gregory ............ 29/848

5,824,253 A 10/1998 Kassardjian et al.

FOREIGN PATENT DOCUMENTS

| DE | 37 13 710 | 11/1987 |
|---|---|---|
| FR | 1.414.582 | 10/1965 |
| FR | 2349441 | 11/1977 |
| JP | 63-162209 | 7/1988 |
| JP | 01-184113 | 7/1989 |
| JP | 04-062119 | 2/1992 |
| JP | 05-124060 | 5/1993 |
| JP | 10-051172 | 2/1998 |
| JP | 2003-251633 | 9/2003 |

* cited by examiner

Primary Examiner—Monica A Huson
(74) Attorney, Agent, or Firm—Robert L. Epstein; Epstein Drangel Bazerman & James, LLP

(57) ABSTRACT

The invention relates to a method of making a part (2) of thermoplastic material covered on the surface by an electrically conductive foil (4) of thickness less than 0.1 mm, the part also including a rib (6), and the method comprising a step of depositing on an inside surface of a mold defining the shape of the part (2), an electrically conductive foil (4) in such a manner as to cover at least part of a blind orifice of the mold opening out into its inside surface and defining the shape of the rib (6), a step of forming at least one opening (14) through the foil (4) leading to the orifice and shaped to allow the fluid thermoplastic material to pass therethrough, and to ensure that the foil (4) remains in a single piece, and a step of filling the mold with fluid thermoplastic material.

11 Claims, 2 Drawing Sheets

METHOD OF MAKING A RIBBED PART OUT OF THERMOPLASTIC MATERIAL COVERED IN A CONDUCTIVE FOIL, AND A RIBBED PART

TECHNICAL FIELD

Parts made of thermoplastic material covered on the surface in an electrically conductive foil, and including at least one rib.

STATE OF THE ART

Automobile manufacturers seek to make use of the huge outside surface constituted by the bodywork of a vehicle to provide radiating elements such as a sensor or an antenna. For this purpose, it is known to overmold an electrically conductive foil, e.g. made of aluminum, in thermoplastic material in order to obtain a bumper skin or a fairing that includes a radiating element. Aluminum foil is used having thickness of less than 0.1 millimeters (mm), e.g. foodgrade aluminum foil having thickness substantially equal to 0.07 mm. The term aluminum "foil" is generally used when the thickness is less than 0.15 mm, whereas the term aluminum "sheet" is used when the thickness is greater than 0.15 mm.

The overmolding is conventionally performed by depositing an electrically conductive foil on an inside surface of a mold defining the shape of the skin or of the fairing. For reasons of appearance and in order to protect the radiating element, the conductive foil needs to be located on the inside face of the part. However those two bodywork parts generally do not include ribs.

Problem Posed by the State of the Art

Given that a bodywork part made of thermoplastic material is quite flexible, it is not unusual for such a part to need to be stiffened by ribs located on its inside surface.

However the known method of overmolding the aluminum foil cannot be used for a part that has ribs on its inside face.

In order to obtain a part having a rib on its inside face, the mold for the part conventionally includes a blind orifice opening out into the face of the mold that defines the inside face of the part.

If it is desired to make a ribbed part covered in a conductive foil by using the same method as is used for making a part that is not ribbed, then the blind orifice would be covered by the conductive foil placed on the face of the mold that defines the inside surface of the part.

Thermoplastic material would then be injected into the mold under pressure. The thermoplastic material would spread throughout the mold and in particular into the blind orifice, such that under the effect of the pressure it would tear the conductive foil covering the orifice. Because it is so fine, such foil cannot withstand the pressure of the thermoplastic material, unlike a sheet or a plate which is stronger.

A thermoplastic part would then be obtained that is covered in a conductive foil that is locally interrupted at the rib. The electrical conduction of the conductive foil would then be interrupted at the rib.

Consequently, overmolding is not appropriate for fabricating a ribbed part covered in a conductive foil. That is why that method has until now been considered unsuitable by the person skilled in the art.

Since conventional overmolding on a conductive foil cannot be performed when making a part that is ribbed, it is possible to use a different method in which the conductive foil is put into place subsequently. The part of thermoplastic material is molded initially, and then it is covered in a conductive foil, taking care to ensure that the foil covers the ribs.

That method increases the quantities of conductive material used but without improving the performance of the sensor or the antenna. In addition, the action of laying the conductive foil is complicated by the angles constituted by the rib. Furthermore the method requires the dimensions of the mold used to be modified in order to allow for the thickness of the sheet, and such modification is not required with overmolding techniques.

The known method of fabricating a ribbed part out of thermoplastic material that is covered in a conductive foil thus presents numerous drawbacks.

The invention seeks to propose a method of obtaining a ribbed part made of thermoplastic material and covered in a conductive foil that does not present any of the above-mentioned drawbacks.

Solution Proposed by the Invention

An electrically conductive one-piece foil having thickness of less than 0.1 mm is deposited on an inside surface of a mold defining the shape of the part in such a manner as to cover at least in part a blind orifice of the mold opening out into the inside surface and defining the shape of a rib.

At least one orifice opening is formed in the foil, the opening being shaped in such a manner as to allow fluid thermoplastic material to pass through the opening, and to allow the foil to remain in one piece.

The mold is filled with fluid thermoplastic material.

The present inventors have found that providing the openings are large enough, then the mold can be filled with the thermoplastic material without tearing the foil. The foil thus remains in a single piece once the final part has been obtained, and electrical conduction is ensured over the entire surface of the foil.

The resulting thermoplastic material part has an outside surface and at least one rib projecting from the surface, the base of the rib being substantially elongate and extending in a longitudinal direction. In addition, the outside surface is covered by a one-piece electrically conductive foil of thickness less than 0.1 mm and comprising, firstly two portions situated on either side of the base of the rib, and secondly at least one bridge of material crossing the base of the rib in a substantially transverse direction.

Particular Embodiments

The mold is filled by injecting molten thermoplastic material.

The molten thermoplastic material is injected close to the rib. In this way, it is possible to control more accurately the pressure of the thermoplastic material in the vicinity of the rib.

A step of compressing the mold is also implemented.

The opening is made by perforating the foil.

The perforations in the foil are regularly spaced over the opening of the orifice. The regular spacing makes it possible to ensure that a bridge of material between two perforations is not subjected to excessive pressure that might cause it to give way.

The surface area of the opening is at least 10 square millimeters ($mm^2$) so as to allow the thermoplastic material to flow therethrough.

The orifice opening formed in the foil is shaped in such a manner that the foil covers the orifice at least in part.

The orifice opening provided in the foil is shaped in such a manner that the surface area of the zone of the orifice that is covered by the foil is greater than the surface area of the zone of the orifice that is not covered by the foil. That makes it possible to minimize the disturbances in the electrical conductivity of the foil generated by the opening formed in the foil.

The part forms any of the parts of a motor vehicle taken from the set constituted by at least a bumper skin, a skin reinforcement, an impact absorber, a fender liner, a fairing, a deflector, a front panel, a spoiler, a tailgate and its frame, a roof, a hood, a rearview mirror, and a wheel arch.

The foil is made of aluminum.

DESCRIPTION OF AN EXAMPLE

An embodiment of the invention is described with reference to FIGS. 1 to 6 which do not present any limiting character with respect to the scope of the invention.

Vocabulary

Figure 1:
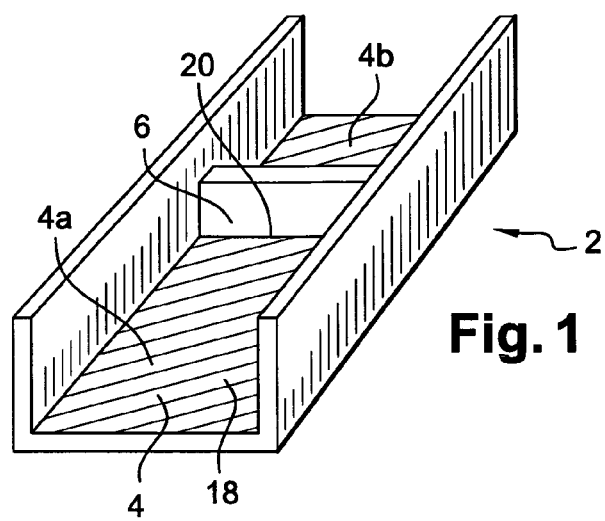
FIG. 1 is a perspective view of a ribbed thermoplastic beam in accordance with the invention.
Figure 2:
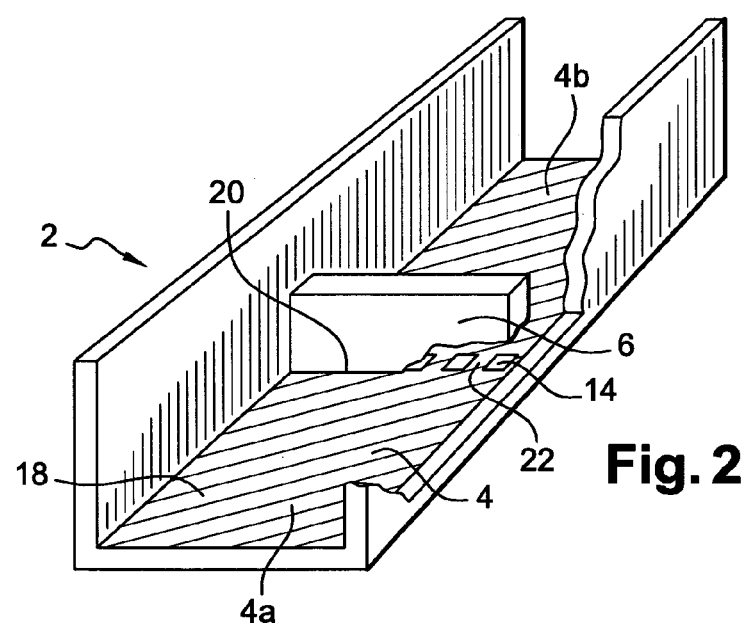
FIG. 2 is a partially cutaway view of the FIG. 1 beam showing the bridges of conductive foil material crossing the base of the rib.
Figure 4:
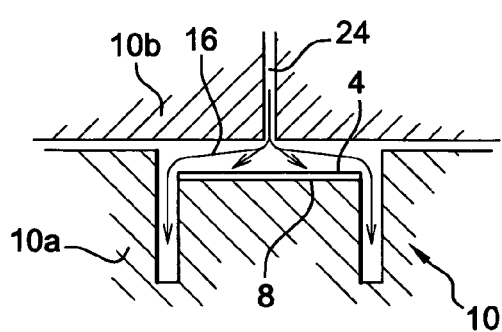
FIG. 4 is a view in cross-section of the FIG. 3 mold.

|  | Of the embodiment | Reference in the drawings |
|---|---|---|
| Part | Beam | 2 |
| Foil | Aluminum foil | 4 |
| Rib | Rib | 6 |
| Inside surface | Inside surface | 8 |
| Mold | Mold | 10 |
| Orifice | Cavity | 12 |
| Opening | Hole, perforation | 14 |
| Thermoplastic material | Thermoplastic material | 16 |
| Outside surface | Outside surface | 18 |
| Base of rib | Base of rib | 20 |
| Portions | Portions | 4a and 4b |
| Bridges | Bridges | 22 |

Detail of Embodiments

Figure 5:
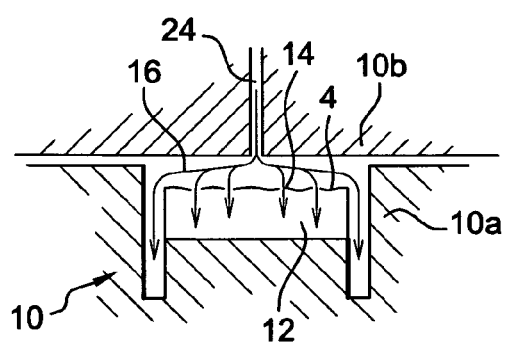
FIG. 5 is a view similar to FIG. 4, taken through the rib.
Figure 3:
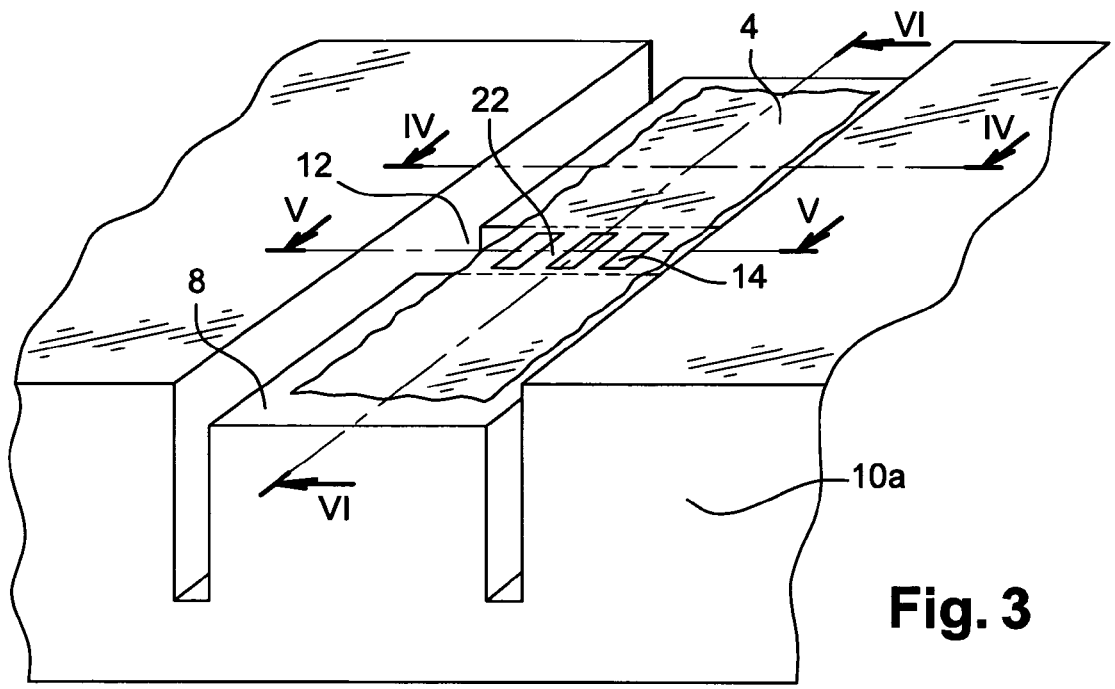
FIG. 3 is a perspective view of a mold portion used for obtaining the beam of FIG. 1.
Figure 6:
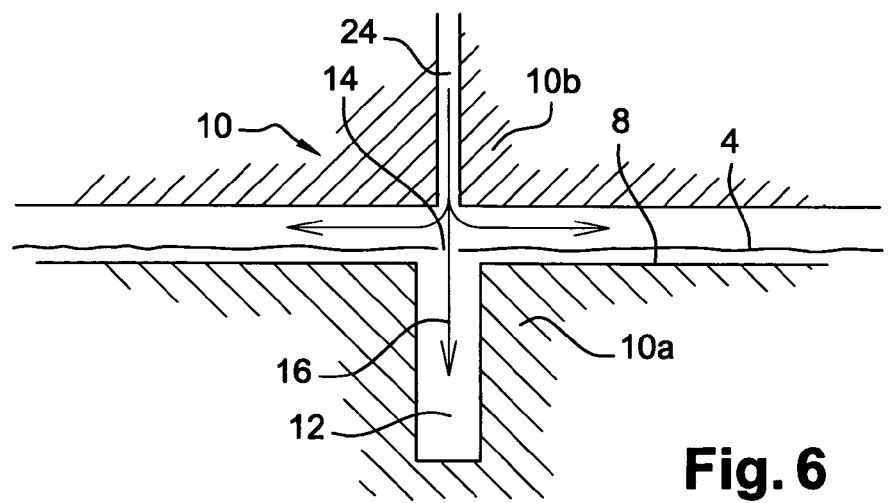
FIG. 6 is a view in longitudinal section of the FIG. 3 mold.

| Reference | Explanation |
|---|---|
| 10a and 10b | Portions constituting the mold 10. |
| 24 | Duct for injecting thermoplastic material into the mold. Preferably, and as shown in FIGS. 5 and 6, the ducts 24 are placed in register with cavities 12. |
| 10 | The mold used is conventional. It operates either by injection or by injection and compression. |
| 14 | The perforations 14 are obtained in conventional manner by means of a punch. |

General Explanation

The thermoplastic material 24 injected into the mold tends to fill it completely. In particular, the thermoplastic material 24 passes through the perforations 14 to fill the cavity 12. Providing the rate of injection is not too high, the thermoplastic material does not tear the bridges 22, so the electrical connection between the portions 4a and 4b of the foil 4 is conserved.

The invention claimed is:

1. A method of making a vehicle part of thermoplastic material including at least one rib and covered on its surface in an electrically conductive one-piece foil of thickness less than 0.1 mm, the method comprising the following steps:
   depositing the electrically conductive foil on an inside surface of a mold defining the shape of the part, the foil covering at least in part a blind orifice of the mold opening out into the inside surface and defining the shape of the rib, the blind orifice being substantially elongate and extending in a longitudinal direction;
   providing at least one opening to the orifice in the foil, the opening being shaped in such a manner:
      as to allow the fluid thermoplastic material to pass through the opening, and
      as at least one conductor bridge crosses the rib in a substantially transverse direction so that the foil remains in one piece; and
   filling the mold with fluid thermoplastic material.

2. A method according to claim 1, in which the mold is filled by injecting molten thermoplastic material.

3. A method according to claim 2, in which the molten thermoplastic material is injected close to the rib.

4. A method according to claim 2, further including a step of compressing the mold.

5. A method according to claim 1, in which the opening is made by perforating the foil.

6. A method according to claim 5, in which the perforations in the foil are made to be regularly spaced over the opening of the orifice.

7. A method according to claim 1, in which the surface area of the opening is at least 10 mm$^2$.

8. A method according to claim 1, in which the opening to the orifice formed through the foil is shaped in such a manner that the foil covers the orifice at least in part.

9. A method according to claim 8, in which the opening to the orifice formed through the foil is shaped in such a manner that the surface area of the zone of the orifice that is covered by the foil is greater than the surface area of the zone of the orifice that is not covered by the foil.

10. A method of making a vehicle part of thermoplastic material including at least one rib and covered on its surface in an electrically conductive one-piece foil of thickness less than 0.1 mm, the method comprising the following steps:
   depositing the electrically conductive foil on an inside surface of a mold defining the shape of the part, the foil covering at least in part a blind orifice of the mold opening out into the inside surface and defining the shape of the rib, the blind orifice being substantially elongate and extending in a longitudinal direction;
   providing at least one opening to the orifice in the foil, the opening being shaped in such a manner that the foil covers the orifice at least in part and that the surface area of the zone of the orifice that is covered by the foil is greater than the surface area of the zone of the orifice that is not covered by the foil, the opening being also shaped in such a manner as to allow the fluid thermoplastic material to pass through the opening and as at least one conductor bridge crosses the base of the rib in a substantially transverse direction so that the foil remains in one piece; and
   filling the mold with fluid thermoplastic material.

11. A method of making a vehicle part of thermoplastic material including at least one rib and covered on its surface in an electrically conductive one-piece foil of thickness less than 0.1 mm, the method comprising the following steps:

depositing the electrically conductive foil on an inside surface of a mold defining the shape of the part, the foil covering at least in part a blind orifice of the mold opening out into the inside surface and defining the shape of the rib, the blind orifice being substantially elongate and extending in a longitudinal direction;

providing at least one opening to the orifice in the foil, the opening being shaped in such a manner that the foil covers the orifice at least in part and being shaped in such a manner as to allow the fluid thermoplastic material to pass through the opening and as at least one conductor bridge crosses the base of the rib in a substantially transverse direction so that the foil remains in one piece; and filling the mold with fluid thermoplastic material.

* * * * *